United States Patent [19]
Robinson

[11] 3,764,644
[45] Oct. 9, 1973

[54] METHOD FOR FORMING A PROTRUSION ON A BLOW MOLDED ARTICLE

[75] Inventor: Leroy E. Robinson, Bartlesville, Okla.

[73] Assignee: Phillips Petroleum Company, Bartlesville, Okla.

[22] Filed: Apr. 30, 1971

[21] Appl. No.: 139,041

[52] U.S. Cl. .................... 264/89, 264/94, 264/296, 425/387 B
[51] Int. Cl. ............................................. B29c 17/07
[58] Field of Search .................. 264/89, 90, 92, 93, 264/94, 96–99, 296; 425/326, 387, 388; 65/77, 78

[56] References Cited
UNITED STATES PATENTS

| | | | |
|---|---|---|---|
| 3,463,844 | 8/1969 | Griffin | 264/89 |
| 3,441,983 | 5/1969 | Cheney | 264/89 X |
| 3,337,664 | 8/1967 | Lyon | 264/92 X |
| 3,184,297 | 5/1965 | Van Zonneveld | 65/78 |

FOREIGN PATENTS OR APPLICATIONS

| 220,099 | 11/1957 | Australia | 425/326 |
|---|---|---|---|
| 1,433,123 | 1966 | France | 264/296 |

OTHER PUBLICATIONS

Allison & Doyle, "Thermoforming Techniques For High–Density Polyolefin Sheet," Modern Plastics, June, 1961, pp. 124–125.

Primary Examiner—Robert F. White
Assistant Examiner—J. H. Silbaugh
Attorney—Young & Quigg

[57] ABSTRACT

A method for blow molding an article having a necked portion or protrusion extending from the article. A plunger member moves a portion of a plasticized parison in a first direction while exerting a fluid force on the parison for blow molding said parison and then moves the portion of the parison in a second opposed direction while exerting said fluid force for forming a necked portion or protrusion having walls of substantially uniform thickness.

3 Claims, 3 Drawing Figures

PATENTED OCT 9 1973 3,764,644

INVENTOR.
L. E. ROBINSON
BY Young & Quigg
ATTORNEYS

METHOD FOR FORMING A PROTRUSION ON A BLOW MOLDED ARTICLE

In blow molding of a plasticized parison, it is sometimes desirable to form a necked portion or a protrusion extending from the body of the blow-molded article. Where the protrusion or necked portion intersects the article body at an angle of around 90°, it has heretofore been very difficult to form said protrusion having walls of a substantially uniform thickness. Where the wall Thickness varies significantly, the resultant formed article has an objectionable appearance and/or an unsatisfactory strength.

This invention, therefore, resides in a method for forming a necked portion or protrusion on a molded plastic article by moving a portion of the plasticized parison in a first direction while exerting a fluid force on the parison for blow molding said parison and then moving the parison portion in a second opposed direction while exerting said fluid force, thereby forming a necked portion or protrusion having walls of substantially uniform thickness. The parison can be formed from any suitable plastic, such as polyethylene, polypropylene, polystyrene, polyvinyl chloride, and the like.

Other aspects, objects and advantages of the present invention will become apparent from a study of the disclosure, the appended claims, and the drawing.

The drawing is a diagrammatic view of the blow molding apparatus of this invention.

Figure 1:
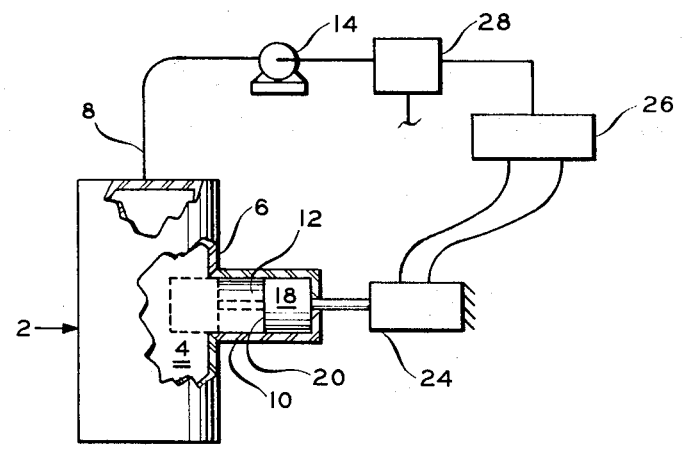
FIG. 1 shows the blow molding apparatus.

Referring to FIG. 1, a mold 2 of a blow molding apparatus has a mold chamber 4 formed by mold walls 6, a conduit 8 associated with the mold and in communication with the mold chamber 4 for passing fluid thereinto and subchamber walls 10 forming a mold subchamber 12 in communication with the mold chamber 4 and extending transversely therefrom.

The forming of the portion of the molded article with which this invention is directed can be a protrusion which extends outwardly from the body of the formed article or a protrusion which extends inwardly toward the axis of the article. That protrusion can circumscribe the formed article to form a deep draw-necked portion or rim or can extend about only a portion of the circumference of the article. The relatively sharp-pointed area of interruption formed by the method and apparatus of this invention shall hereinafter be referred to as a protrusion, and this term shall include all article portions that extend transversely to the formed article without regard to the surface configuration of said interrupted area.

The conduit 8 is connected to a pressurized fluid source for passing pressurized fluid into the mold for blow molding a plasticized parison 16 as well known in the art. Means are provided for removably positioning the parison within the mold chamber 4. These means are constructed in various forms but are also well known in the art of blow molding.

The plunger member 18 is positioned within the mold subchamber 12. The plunger member 18 has an end 20 and an end portion 22 and is movable relative to the mold 2 between a first position (shown by broken lines) at which the end portion 22 of the plunger member 18 extends a distance from the mold subchamber 12 into the chamber 4 of the mold 2 and a second position (shown by solid lines) at which the end 20 of the plunger member 18 is spaced along the mold subchamber 12 a distance from the mold chamber 4.

An actuation means 24, preferably a hydraulic cylinder, is connected to the plunger member 18 for moving said member between its first and second positions. Where a hydraulic cylinder 24 is utilized, a pressurized fluid source 26 is operably connected to the cylinder 24 for moving the plunger member 18 in the desired manner. The pressurized fluid source 26 can be separate from or identical with the pressurized fluid source that is connected to the mold 2.

A controlling means 28 is preferably connected to the pressurized fluid source 26 and a pump 14 for controlling the passage of fluids into the hydraulic cylinder 24 and the mold 2 in a preselected sequence, to be later described. The controlling means can be, for example, a rheostat connected to an electrically operated centrifugal pump 14 and regulated to increase the pump speed at preselected time periods, or said controlling means can be other conventional controlling apparatus well known in the art for selectively controlling pressures.

It is preferred that the end 20 of the plunger member 18 at its first position extend into the mold chamber 4 a distance substantially equal to the distance the end 20 of the plunger member 18 is spaced along the subchamber 12 from the mold chamber 4. At the second position of said plunger member 18, the end of said plunger member is spaced along the mold subchamber 12 a distance from said mold chamber 4.

Figure 2:
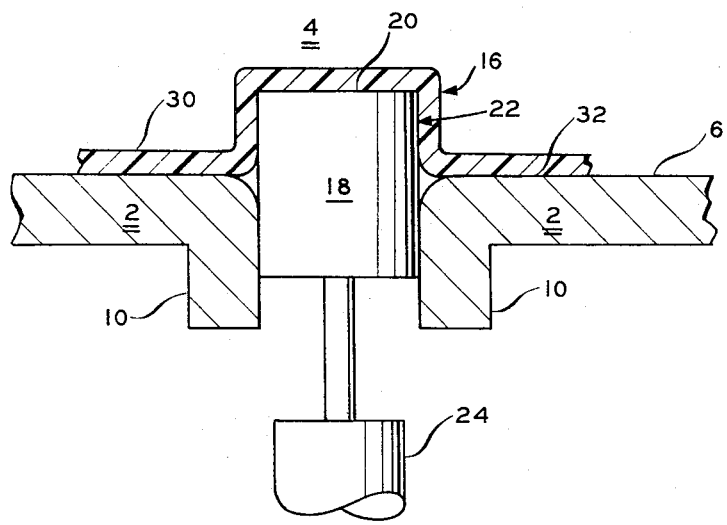
FIG. 2 shows a portion of the apparatus in a partial sectional view with the plunger member positioned at one location.
Figure 3:
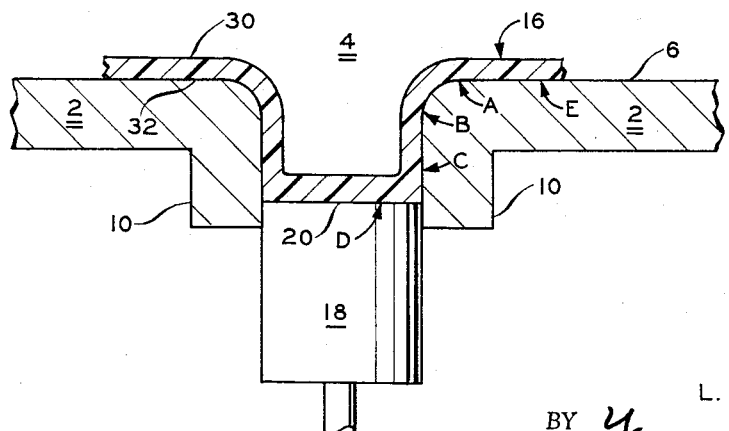
FIG. 3 shows a portion of the apparatus in a partial sectional view with the plunger member positioned at another location.

Referring to FIG. 2, the plasticized parison 16 has been dropped and is positioned within the chamber 4 of the mold 2. The machine (not shown) for forming the parison is well known in the art. The plunger member 18 is at the first position and fluid force is being exerted against the surface 30 of the parison 16. FIG. 3 shows the parison 16 contacting the subchamber walls 10 and the end 20 of the plunger member 18 with said plunger member being positioned at the second position. In this second position, fluid force is also being exerted against the surface 30 of the parison 16.

As shown in FIGS. 2 and 3, the end 20 of the plunger member 18 is of a configuration substantially mateable with the configuration of the mold subchamber 12. That end 20, however, can be of a different configuration from the mold subchamber 12 so long as said end can be moved between the first and second positions as described above.

In the operation of the apparatus of this invention, a plasticized parison 16 is inserted into the mold chamber 4 as known in the art. The plunger member 18 is then passed by actuation means 24 along the mold subchamber 12 and into contact with an outer surface 32 of the parison 16 at the location at which the protrusion is desired to be formed thereon. The plunger member 18 is then moved in a first direction a first distance into the mold chamber 4 to the first position of the plunger member 18 while exerting a fluid force against the inner surface 30 of the parison 16. This movement of the plunger member 18 causes the plasticized parison 16 to drape over the plunger member 18. During this draping over of the parison portion about the plunger member 18, the fluid force on the parison portion is uniformly distributed thereover which causes the parison portion to substantially uniformly drape and be substantially uniformly expanded and forced into intimate engagement with the plunger member 18.

The plunger member 18 subsequently moves to the second position while the parison is still in the plasticized condition with the fluid force continuing to be exerted on the inner surface 30 of the parison 16. This causes the plasticized parison portion to be extended from the parison body in a reverse direction from its position in contact with the plunger member 18 at the first position. Since the parison portion was expanded and preformed at the first position, the movement of the plunger member 18 to the second position functions to move the parison portion into the final configuration and causes substantially no change in the wall thickness of the parison portion owing to the prior preforming step.

Where it is desired to form a protrusion extending a relatively large distance from the body of the article, the plunger member 18 can be constructed to move a greater distance along the subchamber 12 relative to the mold wall 6 than said plunger member 18 moves from said wall 6 in the opposed direction. This then would cause possibly a significant amount of change in the wall thickness of the parison portion forming the protrusion, but the resultant article will have a protrusion of more uniform wall thickness than articles formed by heretofore utilized methods which do not precede the final blowing step with a preforming step.

After the plunger member 18 arrives at the second position, the fluid force is maintained on said inner surface 30 of the parison 16 for a time sufficient for the parison to set sufficiently for said parison to be removed from the mold 2 without causing damage thereto. This period of time is dependent upon factors such as molding material, types of mold cooling employed, and other factors and can be determined by one skilled in the art.

In molding some articles, it may become advantageous to increase the fluid pressure exerted against the parison 16 during movement of the plunger member 18 through and at the second position. By providing an increased fluid pressure during movement of the plunger member 18 to and while said plunger member 18 is at the final position, the protrusion formed thereby can be caused to more exactly conform to the configuration of the mold chambers 4, 12. Where exact configuration with the configuration of the subchamber is not necessary, the end 20 of the plunger member 18 does not necessarily need to be of the configuration of the subchamber 12 and can be smaller than said subchamber 12. Movement of this smaller-sized plunger member will still function to expand and preform the parison portion for subsequent forming of said portion. The end 20 of the plunger member 18 can also be of an irregular configuration for forming a protrusion which has an irregular configuration.

It should also be understood that by altering the sequence of movement of the plunger member 18, the parison can be formed into either an outwardly extending protrusion as set forth above or an inwardly extending protrusion relative to the walls 6 of the mold 2. For forming an inwardly extending protrusion, the plunger initially moves to the second position, thereby permitting the fluid force to extend the parison portion a distance into the subchamber 12 and thereafter moving said parison and plunger member to the first position. In this case, however, the greater fluid pressure should be exerted on the inner surface 30 of the parison 16 at the first position of the plunger member.

Other modifications will become obvious to one skilled in the art.

Referring to FIG. 3, the following example shows the difference and improvement in wall thickness of the protrusion when formed by the method and apparatus of this invention.

EXAMPLE

| Area | Dimensions Conventionally Formed | Dimensions Formed by Instant Invention |
|------|----------------------------------|----------------------------------------|
| A    | 110                              | 75                                     |
| B    | 75                               | 80                                     |
| C    | 25                               | 75                                     |
| D    | 50                               | 140                                    |
| E    | 110                              | 110                                    |

Other modifications and alterations of this invention will become apparent to those skilled in the art from the foregoing discussion, example and the accompanying drawing, and it should be understood that this invention is not to be unduly limited thereto.

I claim:

1. A method for forming a protusion on an article being blow molded in a mold from a plastic parison so that the walls of said protrusion are of a substantially uniform thickness, comprising:

moving a portion of the parison within a mold, in a first direction relative to the other portions of the parison to a first position by exerting pressure on the outer surface of the parison with a movable part of the mold at the location of the desired protrusion while exerting a fluid force on an inner surface of the parison to conform the parison to the shape defined by the movable mold part while said parison is in a plasticized condition;

moving the parison portion within the mold in a second direction opposed to the first direction to a second position by moving the movable mild part of the mold in said second direction while exerting a fluid force on the inner surface of the parison sufficient to conform the parison to the shape defined by the movable mold part while said parison is in a plasticized condition; and maintaining the parison portion and the fluid force until said parison sufficientiy sets to hold the molded shape.

2. A method, as set forth in claim 1, wherein the fluid force exerted on the parison differs in magnitude during movement of the parison portion.

3. A method, as set forth in claim 1, wherein the first direction is in a direction inwardly toward an axis of a parison.

* * * * *